(12) United States Patent
Marinet

(10) Patent No.: US 11,921,834 B2
(45) Date of Patent: Mar. 5, 2024

(54) AUTHENTICATION METHOD AND CIRCUIT

(71) Applicant: STMICROELECTRONICS (ROUSSET) SAS, Rousset (FR)

(72) Inventor: Fabrice Marinet, Chateauneuf le Rouge (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 933 days.

(21) Appl. No.: 16/249,804

(22) Filed: Jan. 16, 2019

(65) Prior Publication Data
US 2019/0220587 A1    Jul. 18, 2019

(30) Foreign Application Priority Data
Jan. 16, 2018 (FR) ...................................... 1850332

(51) Int. Cl.
| | |
|---|---|
| *G06F 21/00* | (2013.01) |
| *B41J 2/175* | (2006.01) |
| *G06F 21/44* | (2013.01) |
| *G06K 15/02* | (2006.01) |
| *G06F 21/73* | (2013.01) |

(52) U.S. Cl.
CPC .......... *G06F 21/44* (2013.01); *B41J 2/17546* (2013.01); *B41J 2/17566* (2013.01); *G06K 15/1822* (2013.01); *G06F 21/73* (2013.01); *G06F 2221/2129* (2013.01)

(58) Field of Classification Search
CPC ...... G06F 21/44; G06F 21/73; G06K 15/1822; B41J 2/17546
See application file for complete search history.

(56) References Cited

U.S. PATENT DOCUMENTS

| | | | | |
|---|---|---|---|---|
| 4,826,332 A | * | 5/1989 | Ukai | .......................... B41J 5/44 |
| | | | | 358/1.11 |
| 5,920,591 A | * | 7/1999 | Fukasawa | ........... H04J 13/0022 |
| | | | | 375/142 |
| 9,794,249 B1 | * | 10/2017 | Truskovsky | ........ H04L 63/0435 |
| 2003/0233548 A1 | | 12/2003 | Moreaux et al. | |
| 2004/0168071 A1 | | 8/2004 | Silverbrook | |
| 2005/0038755 A1 | | 2/2005 | Silverbook et al. | |
| 2005/0050325 A1 | | 3/2005 | Ohkubo | |

(Continued)

FOREIGN PATENT DOCUMENTS

| | | |
|---|---|---|
| EP | 1 430 391 B1 | 6/2005 |
| EP | 1 840 731 A2 | 10/2007 |

(Continued)

*Primary Examiner* — Rodman Alexander Mahmoudi
(74) *Attorney, Agent, or Firm* — Seed IP Law Group LLP

(57) ABSTRACT

A method of authenticating a first electronic circuit includes generating a first signature using the first electronic circuit, the generating of the first signature being based on states of a plurality of electric nodes distributed within the first electronic circuit. A second signature is generated using a second electronic circuit, the generating of the second signature being based on states of a plurality of electric nodes distributed within the second electronic circuit. The first signature is compared to the second signature. The first electronic circuit is authenticated based on the comparison of the first signature to the second signature.

33 Claims, 3 Drawing Sheets

(56) References Cited

U.S. PATENT DOCUMENTS

| | | | |
|---|---|---|---|
| 2005/0099872 A1* | 5/2005 | Morgan | G11C 7/065 365/222 |
| 2006/0253811 A1* | 11/2006 | Guo | G06F 30/367 716/115 |
| 2007/0011023 A1 | 1/2007 | Silverbrook | |
| 2007/0143623 A1 | 6/2007 | Walmsley et al. | |
| 2009/0213427 A1* | 8/2009 | Walmsley | G06F 21/606 358/1.15 |
| 2010/0253966 A1 | 10/2010 | Walmsley et al. | |
| 2011/0161903 A1* | 6/2011 | Iwashita | G06F 30/33 716/108 |
| 2012/0069992 A1 | 3/2012 | Jozwiak et al. | |
| 2013/0073873 A1* | 3/2013 | Morioka | H04L 9/3249 713/193 |
| 2013/0241535 A1* | 9/2013 | Magnussen | G01R 31/66 324/126 |
| 2013/0293918 A1 | 11/2013 | Kitamura et al. | |
| 2015/0081579 A1* | 3/2015 | Brown | H04W 4/029 705/325 |
| 2015/0263852 A1* | 9/2015 | Alon | H04L 9/0618 380/28 |
| 2015/0356733 A1* | 12/2015 | Soldea | G16H 30/40 382/128 |
| 2016/0036805 A1* | 2/2016 | Lin | H04L 63/0876 726/5 |
| 2016/0164672 A1 | 6/2016 | Karighattam et al. | |
| 2017/0003620 A1 | 1/2017 | Ignatchenko et al. | |
| 2017/0004168 A1* | 1/2017 | Hakala | H04L 9/007 |
| 2017/0161719 A1* | 6/2017 | Bhatia | G06Q 20/327 |
| 2017/0261545 A1* | 9/2017 | Federley | G01R 31/31703 |
| 2018/0124048 A1* | 5/2018 | Yoo | H04L 9/3236 |
| 2019/0075110 A1* | 3/2019 | Lawson | H04W 12/06 |
| 2019/0098015 A1* | 3/2019 | Hookham-Miller | H04W 4/40 |
| 2019/0220587 A1 | 7/2019 | Marinet | |
| 2019/0222421 A1 | 7/2019 | Daemen et al. | |
| 2019/0303987 A1* | 10/2019 | Ignatius | G06Q 30/0613 |

FOREIGN PATENT DOCUMENTS

| | | |
|---|---|---|
| EP | 2 605 175 A2 | 6/2013 |
| WO | 2015/030818 A1 | 3/2015 |

\* cited by examiner

AUTHENTICATION METHOD AND CIRCUIT

BACKGROUND

Technical Field

The present disclosure generally concerns electronic circuits and systems, and more particularly a mechanism for verifying the authenticity of a product associated with a device.

Description of the Related Art

The presence of non-authentic products, in particular of consumables, of a device is a problem for the device manufacturer and for authorized suppliers of authentic consumables, particularly in case of returns due to functional problems. It is important to be able to distinguish authentic products from non-authentic products.

Authentication processes have the function of verifying that the product or consumable paired with the device is effectively authentic or authorized. For this purpose, the devices and the associated products are equipped with electronic circuits executing authenticity verification protocols when a new product is installed, or periodically.

BRIEF SUMMARY

An embodiment facilitates addressing all or part of the disadvantages of processes of authentication of current products.

An embodiment provides an authentication process compatible with various natures of devices and of products.

In an embodiment, a method comprises: generating a first signature using a first electronic circuit, the generating of the first signature being based on states of a plurality of electric nodes distributed within the first electronic circuit; generating a second signature using a second electronic circuit, the generating of the second signature being based on states of a plurality of electric nodes distributed within the second electronic circuit; comparing the first signature to the second signature; and authenticating the first electronic circuit based on the comparison of the first signature to the second signature. In an embodiment, the first signature is calculated in parallel with execution of code by the first electronic circuit influencing the states of all or part of the plurality of electric nodes of the first electronic circuit. In an embodiment, the second electronic circuit selects one or a plurality of parameters or arguments to be applied to the code. In an embodiment, the second electronic circuit selects a code range to be executed by the first electronic circuit in parallel with the calculation of the first signature. In an embodiment, the selection of the range is random. In an embodiment, the second electronic circuit sends a request to calculate the first signature to the first electronic circuit. In an embodiment, the request includes the code to be executed by the first electronic circuit. In an embodiment, the request includes arguments or a code range. In an embodiment, the plurality of electric nodes distributed in the first electronic circuit have an identical typography with a typography of the plurality of electric nodes distributed in the second electronic circuit. In an embodiment, the plurality of nodes of the first electronic circuit is greater than 1,000. In an embodiment, the first electronic circuit is associated with a printer cartridge and the second circuit is associated with a printer. In an embodiment, the second signature is generated before the first signature.

In an embodiment, a device comprises: an interface, which, in operation, sends and receives signals; and a first electronic circuit coupled to the interface, which, in operation, generates a first signature based on states of a plurality of electric nodes distributed within the first electronic circuit to be compared with a second signature generated by a second electronic circuit of a second device coupled to the interface, the second signature being generated based on states of a plurality of electric nodes distributed within the second electronic circuit. In an embodiment, the first electronic circuit, in operation, receives the second signature from the second device via the interface, compares the first signature to the second signature and authenticates the second device based on the comparison. In an embodiment, the device is a printer and the second device is a printer cartridge. In an embodiment, the first electronic circuit, in operation, transmits the first signature to the second device via the interface for authentication. In an embodiment, the device is a printer cartridge and the second device is a printer. In an embodiment, the first electronic circuit, in operation, generates the first signature in parallel with execution of code by the first electronic circuit influencing the states of all or part of the plurality of electric nodes of the first electronic circuit. In an embodiment, the first electronic circuit, in operation, executes the code based on one or more parameters or arguments received via the interface from the second device. In an embodiment, the first electronic circuit, in operation, executes a code range in parallel with the generation of the first signature based on an argument received via the interface from the second device. In an embodiment, the first electronic circuit, in operation, generates the first signature in response to a request received via the interface from the second device. In an embodiment, said request includes arguments or a code range. In an embodiment, the plurality of electric nodes distributed in the first electronic circuit have an identical typography with a typography of the plurality of electric nodes distributed in the second electronic circuit. In an embodiment, the plurality of nodes of the first electronic circuit is greater than 1,000. In an embodiment, the interface, in operation, transmits and receives near-field communication signals.

In an embodiment, a system comprises: a first electronic circuit, which, in operation, generates a first signature based on states of a plurality of electric nodes distributed within the first electronic circuit; and a second electronic circuit, which, in operation: generates a second signature based on states of a plurality of electric nodes distributed within the second electronic circuit; compares the first signature to the second signature; and authenticates the first electronic device based on the comparison. In an embodiment, the system comprises: a printer cartridge including the first electronic circuit; and a printer including the second electronic circuit. In an embodiment, the first electronic circuit, in operation, generates the first signature in parallel with execution of code by the first electronic circuit influencing the states of all or part of the plurality of electric nodes of the first electronic circuit; the second electronic circuit, in operation, generates the second signature in parallel with execution of the code by the second electronic circuit influencing the states of all or part of the plurality of electric nodes of the second electronic circuit. In an embodiment, the plurality of electric nodes distributed in the first electronic circuit have an identical typography with a typography of the plurality of electric nodes distributed in the second electronic circuit.

In an embodiment, a non-transitory computer-readable medium's contents cause a first electronic circuit of a system to perform a method, the method comprising: executing code which influences states of all or part of a plurality of electric nodes of the first electronic circuit; and generating a first signature, in parallel with the execution of the code by the first electronic circuit, based on states of the plurality of nodes of the first electronic circuit, the first signature to be compared with a second signature generated by a second electronic circuit of the system, the second signature being generated based on states of a plurality of electric nodes distributed within the second electronic circuit. In an embodiment, the contents comprise instructions executed by first electronic circuit. In an embodiment, the contents comprise instructions executed by second electronic circuit. In an embodiment, the contents cause the second electronic circuit to generate the second signature and send a request to the first electronic circuit to cause the first electronic circuit to generate the first signature.

An embodiment provides a method of authenticating a first electronic circuit with a second electronic circuit, wherein a signature is calculated by each circuit, taking into account electric nodes distributed in the corresponding circuit.

According to an embodiment, the signature is calculated in parallel with the execution of a code influencing the states of all or part of the nodes.

According to an embodiment, the second circuit selects one or a plurality of parameters or arguments to be applied to the code.

According to an embodiment, the second circuit selects a range of the code over which the signature is calculated.

According to an embodiment, the selection of the range or of the arguments is random.

According to an embodiment, the second circuit sends a request to calculate the signature to the first circuit.

According to an embodiment, the request includes the code to be executed for the calculation of the signature.

According to an embodiment, said request includes the arguments or the range.

According to an embodiment, each circuit has an identical topography.

According to an embodiment, the number of nodes taken into account in the calculation of the signature is greater than 1,000.

According to an embodiment, the first circuit is associated with a printer cartridge, the second circuit being associated with the printer.

An embodiment provides an electronic circuit comprising a function implementing the above authentication method.

An embodiment provides a printer comprising an electronic circuit comprising a function implementing the above authentication method.

An embodiment provides a cartridge comprising an electronic circuit comprising a function implementing the above authentication method.

An embodiment provides a system of authentication of a product by a device, wherein the product and the device comprise an electronic circuit comprising a function implementing the above authentication method.

The foregoing and other features and advantages will be discussed in detail in the following non-limiting description of specific embodiments in connection with the accompanying drawings.

DETAILED DESCRIPTION

Figure 1:
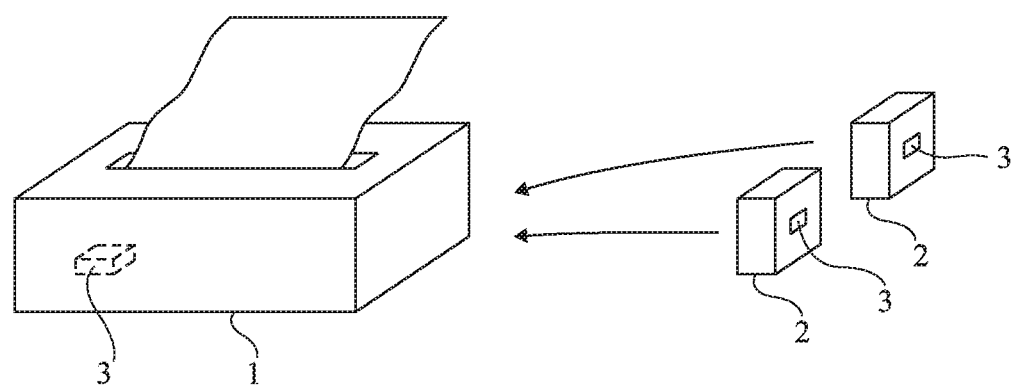
FIG. 1 very schematically shows an example of a device-product system of the type to which the described embodiments apply.

The same elements have been designated with the same reference numerals in the different drawings, unless the context indicates otherwise. In particular, the structural and/or functional elements common to the different embodiments may be designated with the same reference numerals and may have identical structural, dimensional, and material properties.

For clarity, only those steps and elements which are useful to the understanding of the embodiments which will be described have been shown and will be detailed. In particular, the possible mechanisms of data exchange between the circuits of the devices and of the associated products or consumables have not been detailed, the described embodiments being compatible with usual mechanisms.

Throughout the present disclosure, the term "connected" is used to designate a direct electrical connection between circuit elements, whereas the term "coupled" is used to designate an electrical connection between circuit elements that may be direct, or may be via one or more intermediate elements such as resistors, capacitors, transistors or buffers. Unless indicated otherwise, when the term "coupled" is used, the connection can be implemented by a direct connection.

Reference will be made hereafter to an example of application where the device-product system concerns printers (device) and their ink cartridges (products or consumables). However, all that is described applies to any device-product system for which similar problems are posed and, more generally, to any authentication of an electronic circuit by another respecting the described functionalities.

FIG. 1 very schematically shows an example of a device-product system of the type to which the described embodiments for example apply as an example.

It is assumed that the device is a printer 1 and that the products or consumables are ink cartridges 2 for this printer.

To verify the authenticity of cartridges, a mechanism of authentication of cartridge(s) 2 by printer 1, or even of the printer by the cartridge(s), is implemented. To achieve this, printers 1 and cartridges 2 are equipped with electronic circuits 3 capable of exchanging data to implement an authentication process. The communication may be wired or wireless, for example, by near field communication (NFC).

Electronic circuits 3 may have other functions such as, for example, measuring the ink level in the cartridge, and the communication may thus also process other processes than authentication. According to applications, the authentication may be performed each time a cartridge is installed, each time the printer is powered on, before each printing, periodically, etc.

Figure 2:
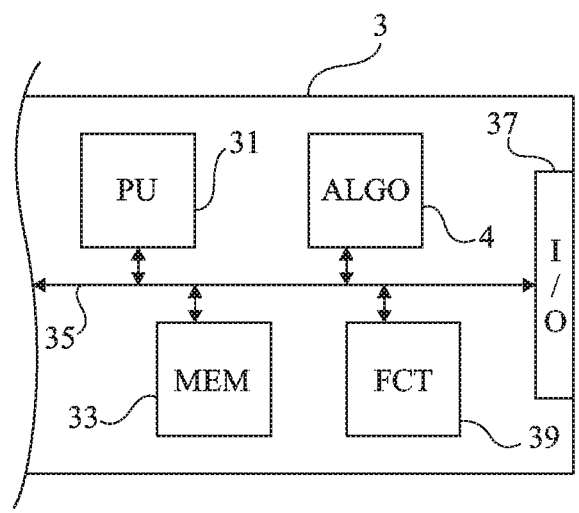
FIG. 2 very schematically shows in the form of blocks an embodiment of an electronic circuit of the type equipping the devices and products of the system of FIG. 1.

FIG. 2 very schematically shows in the form of blocks an embodiment of an electronic circuit 3 of the type equipping the devices (printers) and products (cartridges) of the system of FIG. 1.

Circuit 3 comprises:

a processing unit 31 (PU), for example, a state machine, a microprocessor, a programmable logic circuit, etc.;

one or a plurality of volatile and/or non-volatile storage areas 33 (MEM) for storing all or part of the data and programs;

one or a plurality of data, address, and/or control buses 35 between the different elements internal to circuit 3;

an input-output interface 37 (I/O) for communicating with the outside of circuit 3; and various other circuits according to the application, symbolized in FIG. 2 by a block 39 (FCT).

According to the shown embodiment, circuit 3 further comprises an authentication circuit or function 4 (ALGO) implementing a method of authentication of the printer cartridge(s). Depending on the embodiments, block 4 implements at least one signature calculation.

Block 4 is a circuit executing the cryptographic algorithm by hardware means (wired logic). Its function is to perform a signature calculation in parallel with the execution of a software code, as will be seen hereafter.

To twist authenticity mechanisms, two categories of circuits capable of replicating an alternative authentication mechanism can be encountered.

A first category comprises clone circuits, that is, circuits totally identical to an authentic circuit. Such circuits are generally obtained by copying the general topography (design) of an authentic circuit, so that the circuit operates in the same way.

A second category of non-authentic circuits, which are more current because more easy to form, comprises emulating the operation of an authentic circuit by implementing an adapted program with a standard microprocessor. This requires discovering the secret of the authentication mechanism (particularly the signature key) by cryptographic attacks of side channel or reverse engineering type, but this remains simpler and often more accessible than cloning the circuit (its topography).

A third category comprises a mixture of both.

The described embodiments may facilitate countering the second and third categories of non-authentic circuits.

In an embodiment, an authentication mechanism based on a signature which has the particularity of being linked to the topography of the integrated circuit or of the circuit portion taking part in the authentication and executing the signature is provided. Although reference will be made hereafter to the authentication circuit, what is described may concern a portion only of the circuit.

In an embodiment, it is also provided to equip the printers (devices) and the cartridges (products) with identical authentication circuits, that is, circuits having identical topographies, so that a processing executed on one of the circuits results, when it is executed on the other circuit, in an identical behavior thereof "Behavior" means that the electric behavior of the circuit is identical on execution of a calculation, of a program, or of identical operations.

Figure 3:
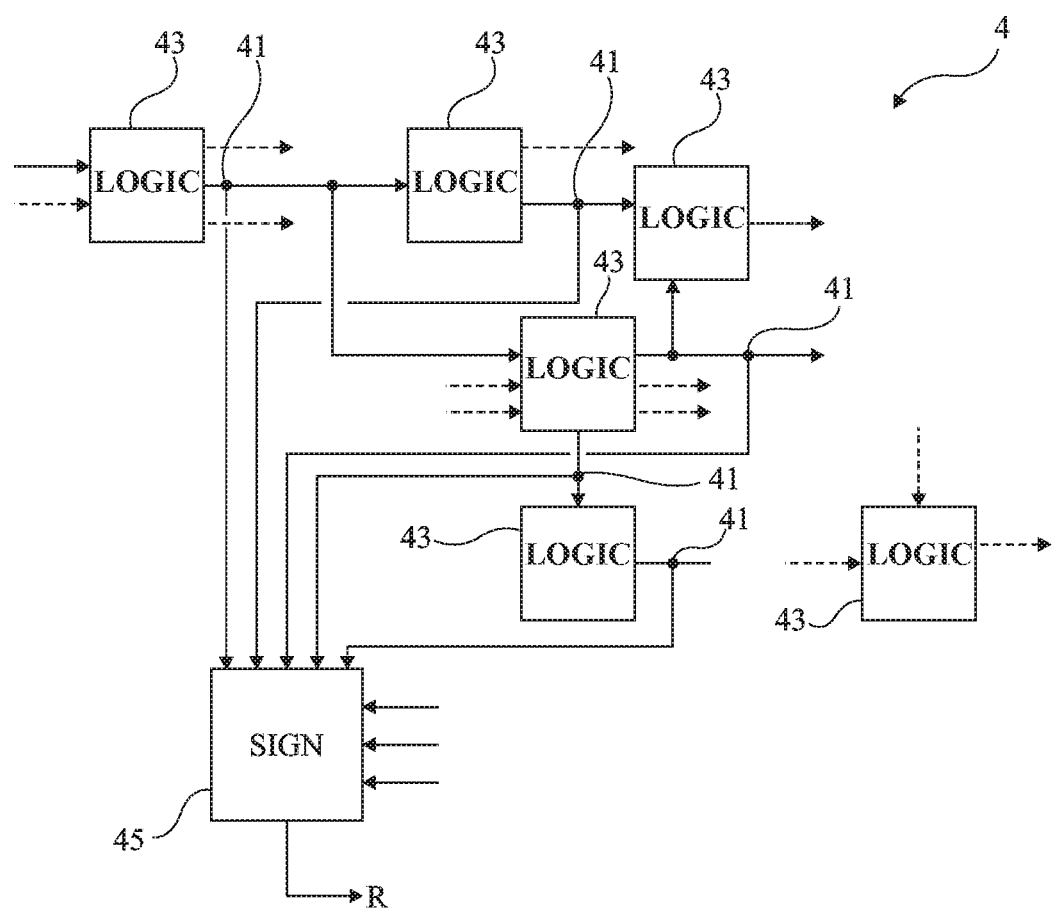
FIG. 3 very schematically shows in the form of blocks an embodiment of an authentication circuit.

FIG. 3 very schematically shows in the form of blocks an embodiment of an authentication circuit 4.

According to an embodiment, authentication circuit 4 is an integrated circuit having a plurality of digital nodes 41 (representing states 0 or 1) connected to a block or signature calculation circuit 45 (SIGN) which combines the respective states to calculate a signature R. Thus, signature R is linked to the topography of circuit 4 in that a circuit having a different topography (for example, a standard processor) will provide a different signature.

Nodes 41 are not specific. Any point of the circuit may be selected to be combined with others and to obtain signature R. In the example of FIG. 3, blocks 43 symbolizing logic circuits having their respective outputs not only coupled to one or a plurality of blocks 43, but also connected to signature calculation block 45, have been illustrated.

The signature calculation function executed by block 45 does not have to be complex. Indeed, what matters is for the signature to be copied by an identical circuit executing a same cycle of instructions or steps of a code or program with the same arguments. Thus, any signature calculation is appropriate, for example, a hash function, or even a direct comparison of a word representing all the sampled states. However, providing a cryptographic processing or combination to calculate a signature increases the robustness of the authentication. "Cycle" means a portion of a code (program), an operation, or more generally any operating phase capable of changing all or part of the states of nodes 41.

Figure 4:
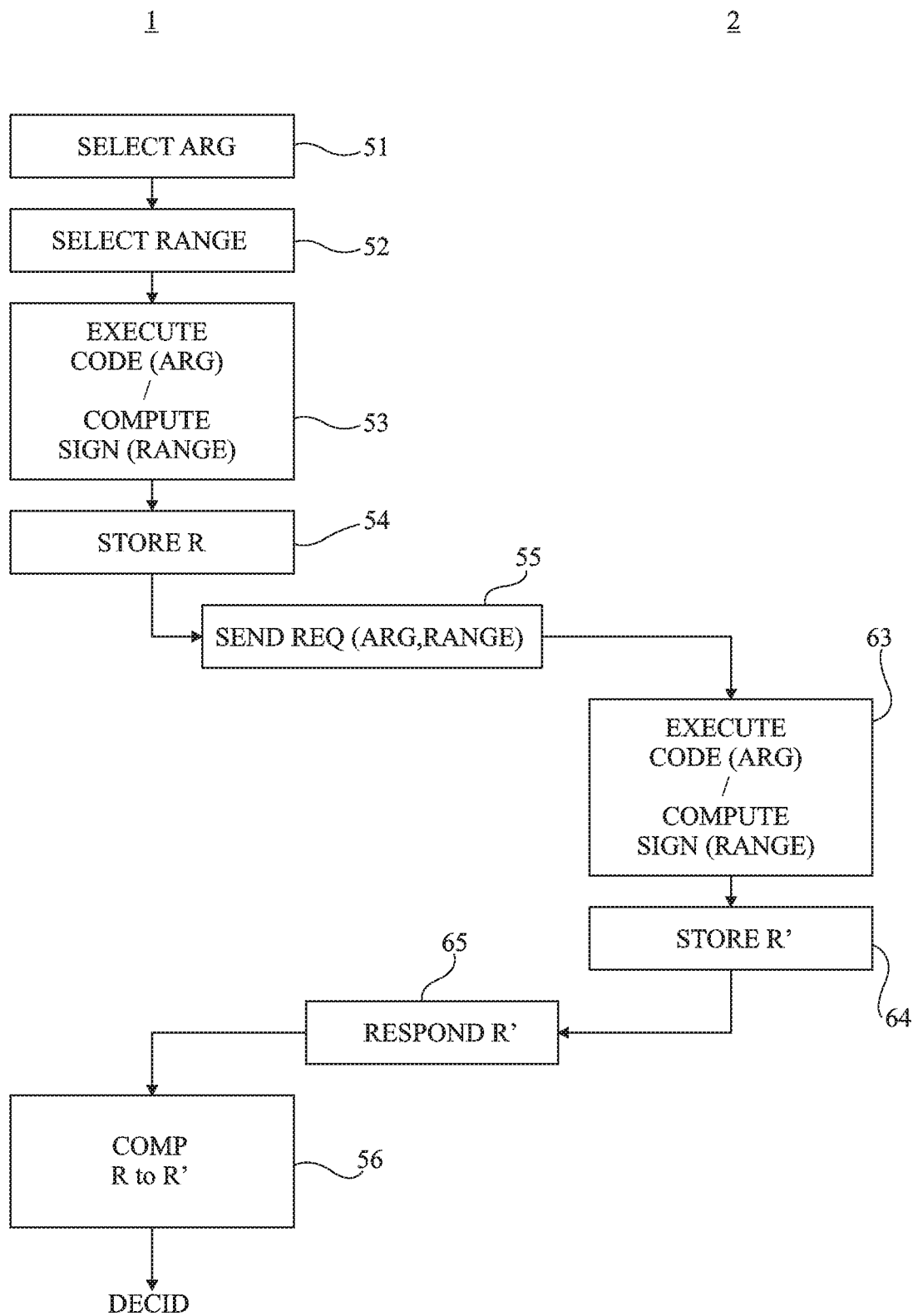
FIG. 4 very schematically shows in the form of blocks an embodiment of the method of authentication of a product by a device.

FIG. 4 schematically shows in the form of blocks an embodiment of a method of authentication of a product by a device.

In this example, an authentication process comprises executing a same code or instruction sequence on the printer circuit side and on the cartridge circuit side, and calculating the signature on a cycle of this code defined by one or a plurality of arguments (variable data) taken into account by the code and by an instruction range of this code. The signature calculation is performed in parallel with the execution of the code, that is, signature calculation block 45 takes into account the values of the different nodes 41 while logic circuits 43 execute the code.

In an embodiment, the executed code, over which the signature is calculated, is fixed. However, to vary the signature, the argument(s) manipulated by the code may be variable, as well as the time of the code or the instruction range when the states of nodes 41 are taken into account for the signature calculation.

In the example of FIG. 4, circuit 4 of printer 1 starts (block 51, SELECT ARG) by selecting one or a plurality of arguments or parameters of the code to be executed. The selection is for example random from among a set of parameters. Then, the circuit selects (block 52, SELECT RANGE), for example, randomly, an instruction range over which a signature R will be calculated. The printer circuit then executes (block 53, EXECUTE CODE(ARG)/COMPUTER SIGN(RANGE)) the instructions sequence (cycle) of the code with the arguments ARG selected at step 51. In parallel, circuit 45 calculates signature R of this execution over the range RANGE selected at step 52. Signature R, which depends on the performed execution, is stored (block 54, STORE R) by circuit 3 of printer 1. Then, the printer (circuit 3) sends an authentication request (block 55, SEND REQ(ARG, RANGE)) to circuit 3 of cartridge 2. The request contains the argument(s) ARG or parameters as well as information representative of the range RANGE during which the signature calculation is to be performed.

The request starts, on the side of cartridge 2, the execution (block 63, EXECUTE CODE(ARG)/COMPUTE SIGN (RANGE)) of the same program or code portion as that of block 53 as well as the signature calculation in the range defined by range RANGE. Since the circuit may be identical to that of the printer, the signature R' obtained by this execution is, for an authentic cartridge, identical to the signature R obtained on the printer side. Conversely, if the cartridge circuit is not identical to that of the printer, the generated signature R' generally will not be equal to signature R. The cartridge stores (block 64, STORE R') the calculated signature R' and sends it to the printer as a response to request 55 (block 65, RESPOND R').

The printer (its circuit 3 or 4) compares (block 56 COMP R to R') the two signatures R and R' and, on this base, supplies signal DECID having its state indicating whether the cartridge is authentic or not.

The embodiment of FIG. 4 is a simplified embodiment to discuss the principles of the performed authentication. The calculations and exchanges may be accompanied by any protection measure usual per se, for example, a symmetrical or asymmetrical ciphering of transmissions between circuits 3. Further, the order in which the signatures are calculated may be reversed (first calculation performed on the cartridges side) or the calculation may be carried out in parallel (the printer starts the execution of the cycle after having sent the request to the cartridge), etc.

The number of nodes 41 selected in circuit 4 and having their electric states taken into account for the signature conditions the robustness of the calculated signature. The larger this number, the more memory space is required by the software determination of the signature to store the table of possible signatures. For example, more than 1,000 nodes may be provided to calculate the signature.

The distribution of nodes 41 of circuit 4 taken into account in the signature calculation depends on the application and may be selected so that all nodes 41 are in a same integrated circuit. The more the nodes are distributed in a significant surface area of the circuit, the more this complicates the copying of the signature and this compels to clone a significant portion of the electronic circuit. Thus, the nodes may be taken in circuit 4, or even more widely in processor 31, or also in any portion of circuit 3.

Instruction range RANGE having the signature evaluated at the end of its execution may be variable, just like arguments ARG.

Similarly, arguments or parameters ARG may be variable.

The range and the arguments are, for example, randomly selected by the printer for each signature verification.

The size of signature R is not critical. However, a signature over a too small number of bits increases the risk of an authentication by chance. Thus, according to an embodiment, the signature comprises at least some hundred bits.

The arguments and the number of cycles only are a specific embodiment. As a variation, the printer (or the cartridge) may send into the request the code portion to be executed. The signature may then be based on this code. From one authentication to another, the code portion to be taken into account for the signature may vary.

An advantage of one or more of the described embodiments is that they particularly complicate the forming of a software clone, that is, a clone using a circuit which does not generally correspond to an identical copy of the circuit comprised by the printer. Indeed, the authentication mechanism should be cloned in software fashion, which requires knowing and storing all the signature results to be able to provide the correct response to a request from the printer. The size required for the storage of such responses may rapidly become a problem, in particular if, on the printer side, the instruction range used for the calculation of the signature or of its arguments taken into account is varied.

Various embodiments have been described. Various modifications will occur to those skilled in the art. In particular, although reference has been made to an authentication of a cartridge by a printer, a reverse authentication is also possible. The described signature calculation mechanism is compatible with a mutual authentication. Further, the practical implementation of the embodiments which have been described is within the abilities of those skilled in the art by using on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, by a first electronic circuit from a second electronic circuit, a request to generate a first digital signature, the request identifying code executable by the first electronic circuit;
generating the first digital signature using the first electronic circuit, the generating of the first digital signature including combining digital states of a plurality of electric nodes distributed within the first electronic circuit according to a topography, wherein the first digital signature is calculated in parallel with execution of the code by the first electronic circuit, the execution of the code influencing the digital states of all or part of the plurality of electric nodes of the first electronic circuit;
generating a second digital signature using the second electronic circuit, the generating of the second digital signature including combining digital states of a plurality of electric nodes distributed within the second electronic circuit according to the topography;
comparing the first digital signature to the second digital signature; and authenticating the first electronic circuit based on the comparison of the first digital signature to the second digital signature.

2. The method of claim 1 wherein the request to generate the first digital signature includes one or a plurality of parameters or arguments to be applied to the code.

3. The method of claim 1 wherein the request identifies a code range to be executed by the first electronic circuit in parallel with the calculation of the first digital signature.

4. The method of claim 3 wherein the selection of the range is random.

5. The method of claim 1, wherein the request includes the code to be executed by the first electronic circuit.

6. The method of claim 1, wherein said request includes arguments or a code range.

7. The method of claim 1 wherein the plurality of nodes of the first electronic circuit is greater than 1,000.

8. The method of claim 1 wherein the first electronic circuit is associated with a printer cartridge and the second circuit is associated with a printer.

9. The method of claim 1 wherein the second digital signature is generated before the first digital signature.

10. The method of claim 1, wherein the execution of the code changes a digital state of one or more of the plurality of electric nodes of the first electronic circuit.

11. A device, comprising:
an interface, which, in operation, sends and receives signals; and
a first electronic circuit coupled to the interface, wherein the first electronic circuit, in operation:
receives, via the interface, a request to generate a first digital signature, the request identifying code executable by the first electronic circuit; and
generates the first digital signature by combining digital states of a plurality of electric nodes distributed within the first electronic circuit according to a topography, the first digital signature to be compared with a second digital signature generated by a second electronic circuit of a second device coupled to the interface, the second digital signature being generated based on digital states of a plurality of electric nodes distributed within the second electronic circuit according to the topography, wherein the first digital signature is calculated in parallel with execution of the identified code by the first electronic circuit, the execution of the code influencing the digital states of all or part of the plurality of electric nodes of the first electronic circuit.

12. The device of claim 11 wherein the first electronic circuit, in operation, transmits the first digital signature to the second device via the interface for authentication.

13. The device of claim 12 wherein the device is a printer cartridge and the second device is a printer.

14. The device of claim 11 wherein the first electronic circuit, in operation, executes the identified code based on one or more parameters or arguments received via the interface from the second device.

15. The device of claim 14 wherein the first electronic circuit, in operation, executes a code range in parallel with the generation of the first digital signature based on an argument received via the interface from the second device.

16. The device of claim 11 wherein the request received via the interface is from the second device.

17. The device of claim 16 wherein said request includes arguments or a code range.

18. The device of claim 11 wherein the plurality of nodes of the first electronic circuit is greater than 1,000.

19. The device of claim 11 wherein the interface, in operation, transmits and receives near-field communication signals.

20. The device of claim 11, wherein the execution of the code changes a digital state of one or more of the plurality of electric nodes of the first electronic circuit.

21. A system, comprising:
a first electronic circuit; and
a second electronic circuit, which, in operation, is coupled to the first electronic circuit, wherein:
the first electronic circuit, in operation:
receives a request from the second electronic circuit to generate a first digital signature based on digital states of a plurality of electric nodes distributed, according to a topography, within the first electronic circuit, the request identifying or including code executable by the first electronic circuit; and
generates the first digital signature in response to the request, the generating including:
executing the code, the executing of the code influencing the digital states of all or part of the plurality of electric nodes of the first electronic circuit; and
combining the digital states of the plurality of electric nodes of the first electronic circuit; and
the second electronic circuit, in operation:
generates a second digital signature based on digital states of a plurality of electric nodes distributed, according to the topography, within the second electronic circuit;
compares the first digital signature to the second digital signature; and
authenticates the first electronic circuit based on the comparison.

22. The system of claim 21, comprising:
a printer cartridge including the first electronic circuit; and
a printer including the second electronic circuit.

23. The system of claim 21 wherein:
the second electronic circuit, in operation, generates the second digital signature in parallel with execution of the code by the second electronic circuit influencing the digital states of all or part of the plurality of electric nodes of the second electronic circuit.

24. The system of claim 21, wherein the execution of the code changes a digital state of one or more of the plurality of electric nodes of the first electronic circuit.

25. A non-transitory computer-readable medium having contents which cause a first electronic circuit of a system to perform a method, the method comprising:
receiving, by the first electronic circuit from a second electronic circuit, a request to generate a first digital signature, the request identifying code executable by the first electronic circuit;
executing the code, the executing influencing digital states of all or part of a plurality of electric nodes of the first electronic circuit, the electric nodes being distributed within the first electronic circuit according to a topography; and
generating the first digital signature, in parallel with the execution of the code by the first electronic circuit, the generating including combining digital states of the plurality of nodes of the first electronic circuit, the first digital signature to be compared with a second digital signature generated by a second electronic circuit of the system, the second digital signature being generated based on digital states of a plurality of electric nodes distributed according to the topography within the second electronic circuit.

26. The non-transitory computer-readable medium of claim 25 wherein the contents comprise instructions executed by the first electronic circuit.

27. The non-transitory computer-readable medium of claim 25 wherein the contents comprise instructions executed by the second electronic circuit.

28. The non-transitory computer-readable medium of claim 27 wherein the contents cause the second electronic circuit to generate the second digital signature and send a request to the first electronic circuit to cause the first electronic circuit to generate the first digital signature.

29. A device, comprising:
an interface, which, in operation, sends and receives signals; and
a first electronic circuit coupled to the interface and including a plurality of electric nodes distributed according to a topography within the first electronic circuit, wherein the first electronic circuit, in operation:
generates a first digital signature, the generating of the first digital signature including:
executing code, the executing influencing digital states of all or part of the electric nodes of the first electronic circuit; and
in parallel with the executing of the code, combining digital states of the plurality of electric nodes distributed, according to the topography, within the first electronic circuit;
transmits, via the interface, a request to generate a second digital signature by combining digital states of a second plurality of electric nodes distributed according to the topography within a second electronic device, the request identifying or including the code; and
in response to receipt of the second digital signature, compares the first digital signature to the second digital signature.

30. The device of claim 29 wherein the first electronic circuit, in operation, receives the second digital signature from the second device via the interface, compares the first digital signature to the second digital signature and authenticates the second device based on the comparison.

31. The device of claim 29 wherein the device is a printer and the second device is a printer cartridge.

32. The device of claim 29 wherein the plurality of nodes of the first electronic circuit is greater than 1,000.

33. The device of claim 29, wherein the executing of the code changes a digital state of one or more of the plurality of electric nodes of the first electronic circuit.

* * * * *